US010364767B2

(12) United States Patent
Tsunoda et al.

(10) Patent No.: US 10,364,767 B2
(45) Date of Patent: Jul. 30, 2019

(54) HYBRID VEHICLE

(71) Applicant: TOYOTA JIDOSHA KABUSHIKI KAISHA, Toyota-shi, Aichi-ken (JP)

(72) Inventors: Asuka Tsunoda, Toyota (JP); Takashi Suzuki, Toyota (JP); Tomoya Suzuki, Toyota (JP); Takahiro Nishigaki, Toyota (JP); Kenya Maruyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 106 days.

(21) Appl. No.: 15/730,992

(22) Filed: Oct. 12, 2017

(65) Prior Publication Data
US 2018/0112612 A1 Apr. 26, 2018

(30) Foreign Application Priority Data

Oct. 21, 2016 (JP) ................................. 2016-206981

(51) Int. Cl.
*G05D 1/00* (2006.01)
*G05G 3/00* (2006.01)
(Continued)

(52) U.S. Cl.
CPC ............. *F02D 41/08* (2013.01); *B60W 20/00* (2013.01); *F02D 31/003* (2013.01); *F02D 41/0002* (2013.01); *G06F 15/163* (2013.01); *F02D 2009/0233* (2013.01); *F02D 2200/101* (2013.01); *F02D 2200/501* (2013.01); *F02D 2250/28* (2013.01); *Y02T 10/42* (2013.01)

(58) Field of Classification Search
None
See application file for complete search history.

(56) References Cited

U.S. PATENT DOCUMENTS

| | | | | |
|---|---|---|---|---|
| 5,947,086 A | * | 9/1999 | Hoshino | ............... F02D 11/105 123/396 |
| 2001/0000574 A1 | * | 5/2001 | Wayama | ............... F02D 9/1065 123/337 |
| 2009/0319153 A1 | | 12/2009 | Ando et al. | |

FOREIGN PATENT DOCUMENTS

| | | |
|---|---|---|
| JP | 57-24433 | 2/1982 |
| JP | 63-068744 | 3/1988 |

(Continued)

*Primary Examiner* — Abby Y Lin
*Assistant Examiner* — Kenny A. Taveras
(74) *Attorney, Agent, or Firm* — Finnegan, Henderson, Farabow, Garrett & Dunner, LLP

(57) ABSTRACT

During idle operation of an engine, on satisfaction of a predetermined condition including a condition that a vehicle speed is not higher than a reference value, a hybrid vehicle controls the engine with adjusting a throttle position such that a rotation speed of the engine becomes equal to target idle rotation speed or is in a predetermined rotation speed range including the target idle rotation speed. On non-satisfaction of predetermined condition, the hybrid vehicle controls the engine with setting the throttle position to a fixed value, The reference value is set to provide larger value when the rotation speed of the engine becomes equal to or lower than a predetermined rotation speed that is lower than the target idle rotation speed and is higher than a resonance rotation speed of the vehicle, compared with a value when the rotation speed of the engine is higher than the predetermined rotation speed.

4 Claims, 7 Drawing Sheets

(51) Int. Cl.
*G06F 7/00* (2006.01)
*G06F 17/00* (2019.01)
*F02D 41/08* (2006.01)
*G06F 15/163* (2006.01)
*B60W 20/00* (2016.01)
*F02D 31/00* (2006.01)
*F02D 41/00* (2006.01)
*F02D 9/02* (2006.01)

(56) References Cited

FOREIGN PATENT DOCUMENTS

| | | |
|---|---|---|
| JP | 8-296478 | 11/1996 |
| JP | 2008-120350 | 5/2008 |
| JP | 2010-001759 | 1/2010 |
| JP | 2011-219019 | 11/2011 |
| JP | 2011219019 A * | 11/2011 |
| JP | 2012-51430 | 3/2012 |

* cited by examiner

HYBRID VEHICLE

CROSS-REFERENCE TO RELATED APPLICATIONS

The present disclosure claims priority to Japanese Patent Application No. 2016-206981 filed Oct. 21, 2016, which is incorporated herein by reference in its entirety including specification, drawings and claims.

TECHNICAL FIELD

The present disclosure relates to a hybrid vehicle and more specifically relates to a hybrid vehicle that includes an engine and a motor.

BACKGROUND

A proposed configuration of a hybrid vehicle includes an engine and a motor for driving and performs feedback control of a throttle position during idle operation of the engine such that a rotation speed of the engine is in a predetermined range including a target idle rotation speed (as described in, for example, JP 2012-51430A).

SUMMARY

During idle operation of the engine, a proposed technique performs feedback control (adjustment) of the throttle position during a vehicle stop (and at a very low vehicle speed) and otherwise sets the throttle position to a fixed value. This aims to suppress reduction in the accuracy of the feedback control (adjustment) of the throttle opening due to, for example, a fluctuation of the vehicle speed. During idle operation of the engine at a certain vehicle speed, the rotation speed of the engine is likely to be decreased to a relatively small rotation speed relative to the target idle rotation speed. The hybrid vehicle configured such that the engine and a driveshaft coupled with an axle are connected with each other via a damper and the motor is connected with the driveshaft is generally designed to provide a resonance rotation speed of the vehicle that is sufficiently lower than the target idle rotation speed. There is, however, a possibility that the rotation speed of the engine reaches the resonance rotation speed of the vehicle, so as to increase vibration of the vehicle, depending on the level of a decrease in the rotation speed of the engine relative to the target idle rotation speed.

The hybrid vehicle of the present disclosure thus mainly aims to suppress an increase in vibration of the vehicle during idle operation of an engine.

In order to achieve the above primary object, the hybrid vehicle of the present disclosure employs the following configuration.

The present disclosure is directed to a hybrid vehicle. The hybrid vehicle includes an engine connected via a damper with a driveshaft that is coupled with an axle, a motor connected with the driveshaft and a control device configured to control the engine. During idle operation of the engine, on satisfaction of a predetermined condition including a condition that a vehicle speed is not higher than a reference value, the control device controls the engine with adjusting a throttle position such that a rotation speed of the engine becomes equal to a target idle rotation speed or is in a predetermined rotation speed range including the target idle rotation speed, and on non-satisfaction of the predetermined condition, the control device controls the engine with setting the throttle position to a fixed value. The reference value is set such as to provide a larger value when the rotation speed of the engine becomes equal to or lower than a predetermined rotation speed that is lower than the target idle rotation speed and is higher than a resonance rotation speed of the vehicle, compared with a value provided when the rotation speed of the engine is higher than the predetermined rotation speed.

During the idle operation of the engine, on satisfaction of the predetermined condition including the condition that the vehicle speed is not higher than the reference value, the hybrid vehicle of this aspect controls the engine with adjusting the throttle position such that the rotation speed of the engine becomes equal to the target idle rotation speed or is in the predetermined rotation speed range including the target idle rotation speed. On non-satisfaction of the predetermined condition, the hybrid vehicle of this aspect controls the engine with setting the throttle position to a fixed value. The reference value is set such as to provide a larger value when the rotation speed of the engine becomes equal to or lower than a predetermined rotation speed that is lower than the target idle rotation speed and is higher than a resonance rotation speed of the vehicle, compared with a value provided when the rotation speed of the engine is higher than the predetermined rotation speed. This extends the upper limit of the vehicle speed range in which the predetermined condition is satisfied (i.e., the throttle position is adjusted such that the rotation speed of the engine becomes equal to the target idle rotation speed or is in the predetermined rotation speed range) when the rotation speed of the engine becomes equal to or lower than the predetermined rotation speed, compared with the upper limit when the rotation speed of the engine is higher than the predetermined rotation speed. This suppresses the rotation speed from further decreasing to reach the resonance rotation speed. As a result, this suppresses an increase in vibration of the vehicle during the idle operation of the engine. The "predetermined condition" employed here may include a condition that an acceleration of the vehicle is in a predetermined range including value 0, in addition to the condition that the vehicle speed is not higher than the reference value.

DESCRIPTION OF EMBODIMENTS

The following describes some aspects of the disclosure with reference to embodiments.

Figure 1:
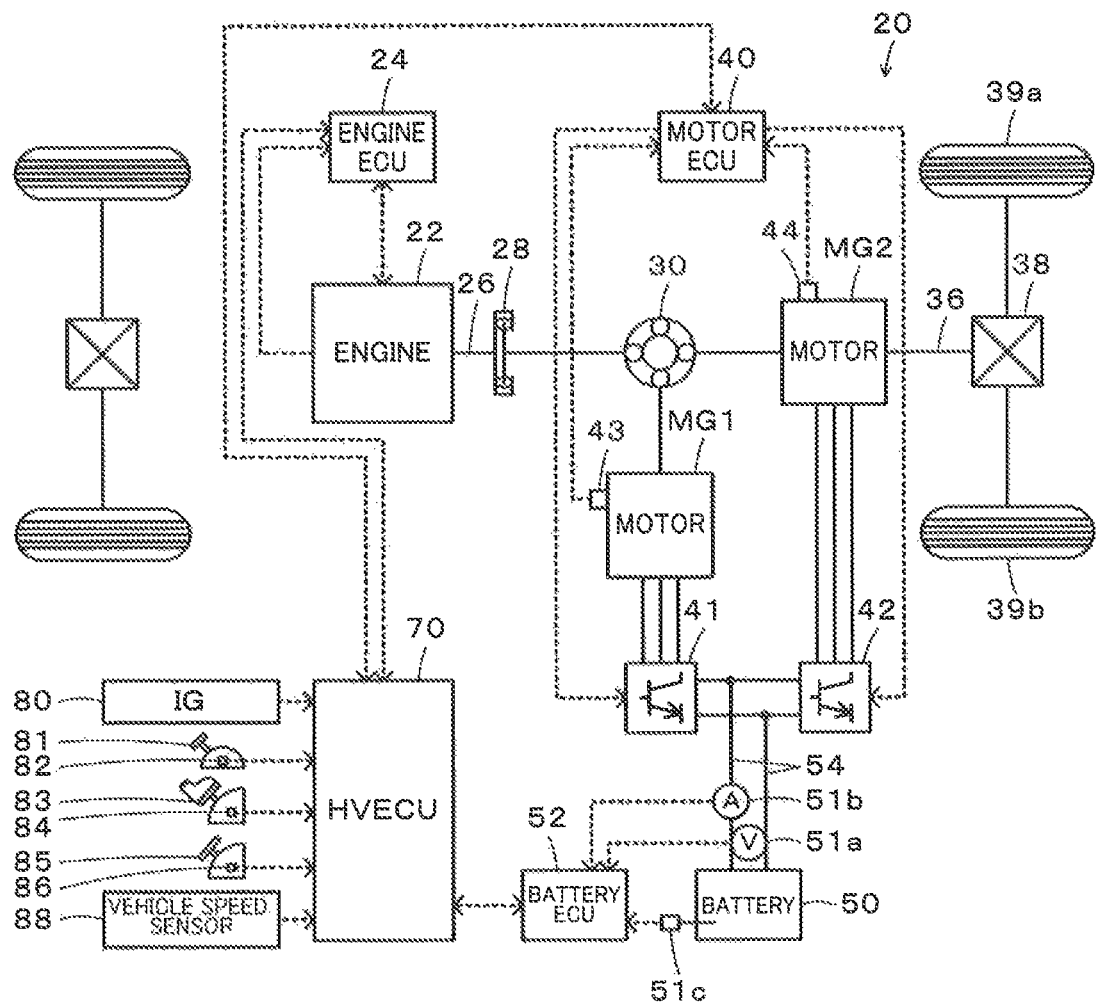
FIG. 1 is a configuration diagram illustrating the schematic configuration of a hybrid vehicle according to one embodiment of the disclosure.
Figure 2:
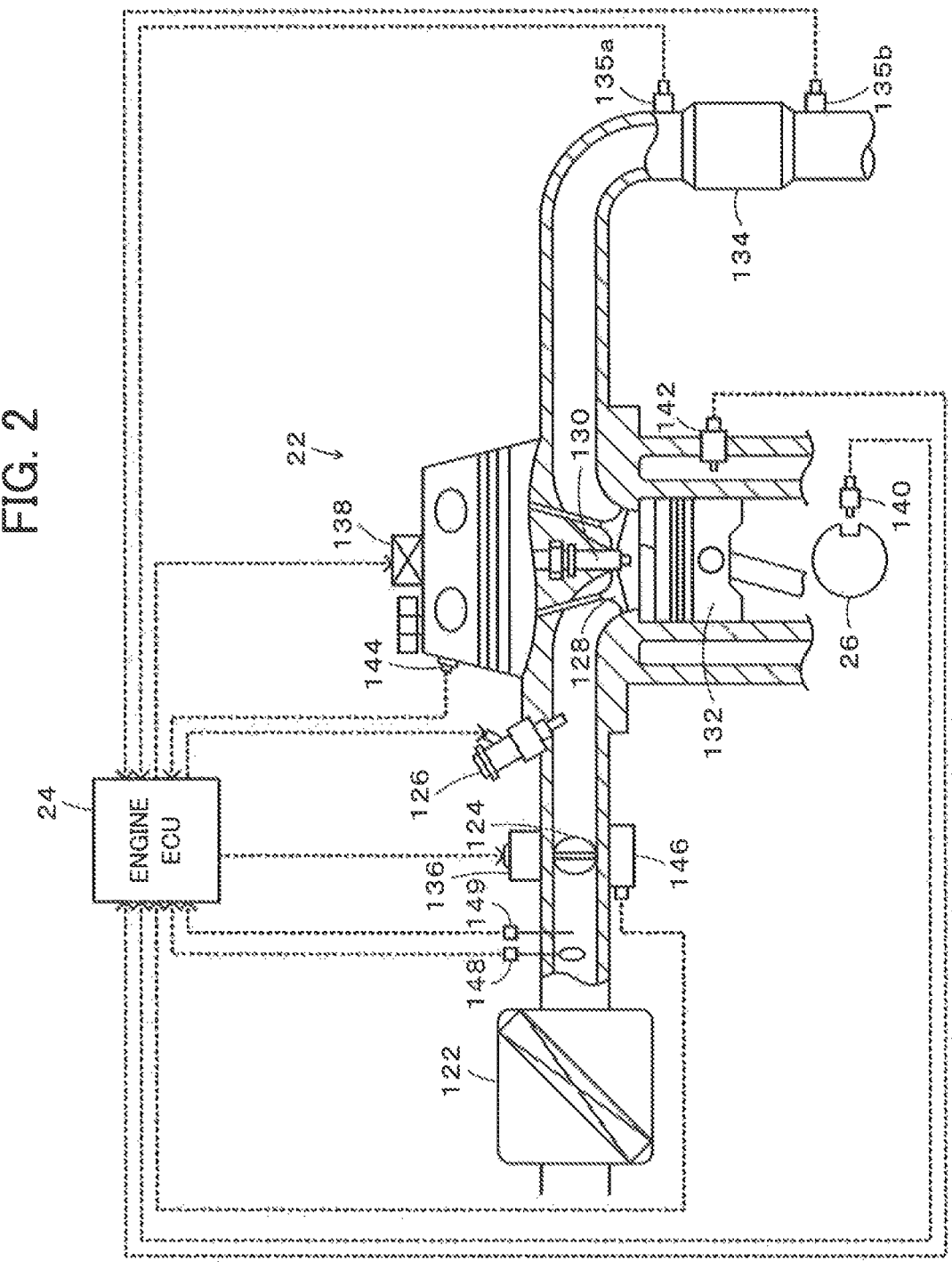
FIG. 2 is a configuration diagram illustrating the schematic configuration of an engine.

FIG. 1 is a configuration diagram illustrating the schematic configuration of a hybrid vehicle 20 according to one embodiment of the disclosure. FIG. 2 is a configuration diagram illustrating the schematic configuration of an engine 22. As shown in FIG. 1, the hybrid vehicle 20 of the embodiment includes an engine 22, a planetary gear 30, motors MG1 and MG2, inverters 41 and 42, a battery 50 as an electrical storage device and a hybrid electronic control unit (hereinafter referred to as HVECU) 70.

The engine 22 is configured as an internal combustion engine that uses a hydrocarbon fuel such as gasoline or light oil to outputs power. As shown in FIG. 2, the engine 22 mixes the intake air cleaned by an air cleaner 122 and taken in via a throttle valve 124 with fuel injected from a fuel injection valve 126 and draws the air-fuel mixture via an intake valve 128 into a combustion chamber. The drawn air-fuel mixture is explosively combusted with electric spark generated by a spark plug 130. The engine 22 converts the reciprocating motion of a piston 132 pressed down by the energy of explosive combustion into the rotational motion of a crankshaft 26. The exhaust gas from the combustion chamber is discharged to the outside air through a catalytic converter 134 that is filled with a conversion catalyst (three-way catalyst) to convert toxic components such as carbon monoxide (CO), hydrocarbons (HC) and nitrogen oxides (NOx) to less toxic components.

As shown in FIG. 1, the engine 22 is operated and controlled by an engine electronic control unit (hereinafter referred to as "engine ECU") 24. The engine ECU 24 is configured as a CPU-based microprocessor and includes a ROM configured to store processing programs, a RAM configured to temporarily store data, input/output ports and a communication port, in addition to the CPU, although not being illustrated. The engine ECU 24 obtains signals input from various sensors required for operation control of the engine 22 via the input port. The signals input into the engine ECU 24 include, for example, a crank angle $\theta cr$ from a crank position sensor 140 configured to detect the rotational position of a crankshaft 26 and a cooling water temperature $T_W$ from a water temperature sensor 142 configured to measure the temperature of cooling water for the engine 22. The input signals also include cam angles $\theta ci$ and $\theta co$ from a cam position sensor 144 configured to detect respectively the rotational position of an intake camshaft provided to open and close the air intake valve 128 and the rotational position of an exhaust camshaft provided to open and close an exhaust valve. The input signals further include a throttle position TH front a throttle valve position sensor 146 configured to detect the posit ion or the throttle valve 124, an intake air flow Qa from an air flow meter 148 mounted to an intake pipe, and an intake air temperature Ta from a temperature sensor 149 mounted to the intake pipe. The input signals additionally include an air-fuel ratio AF from an air-fuel ratio sensor 135a mounted to an exhaust pipe and an oxygen signal O2 from an oxygen sensor 135b mounted to the exhaust pipe. The engine ECU 24 outputs various control signals for the operation control of the engine 22 via the output port. The signals output from the engine ECU 24 include, for example, a driving control signal to a throttle motor 136 such as to regulate the position of the throttle valve 124, a driving control signal to the fuel injection valve 126, and a driving control signal to an ignition coil 138 integrated with an igniter. The engine ECU 24 is connected with the HVECU 70 via the respective communication ports. The engine ECU 24 calculates a rotation speed Ne of the engine 22, based on the crank angle $\theta cr$ input from the crank position sensor 140.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 39a and 39b via a differential gear 38. The planetary gear 30 also includes a carrier that is connected with the crankshaft 26 of the engine 22 via a damper 28.

The motor MG1 is configured as, for example, a synchronous motor generator and has the rotor that is connected with the sun gear of the planetary gear 30 as described above. The motor MG2 is also configured as, for example, a synchronous motor generator and has a rotor that is connected with the driveshaft 36. The inverter 41 and the inverter 42 are respectively connected with the motor MG1 and the motor MG2 and are also connected with the battery 50 via power lines 54. The motor MG1 and the motor MG2 are driven and rotated by switching control of a plurality of switching elements (not shown) included in the respective inverters 41 and 42 by a motor electronic control unit (hereinafter referred to as "motor ECU") 40.

The motor ECU 40 is configured as a CPU-based microprocessor and includes a ROM configured to store processing programs, a RAM configured to temporarily store data, input/output ports and a communication port, in addition to the CPU, although not being illustrated. The motor ECU 40 obtains signals input from various sensors required for drive control of the motors MG1 and MG2 via the input port, for example, rotational positions $\theta m1$ and $\theta m2$ from rotational position detection sensors 43 and 44 configured to detect the rotational positions of the respective rotors of the motors MG1 and MG2. The motor ECU 40 outputs, for example, switching control signals to the plurality of switching elements (not shown) included in the respective inverters 41 and 42 via the output port. The motor ECU 40 is connected with the HVECU 70 via the respective communication ports. The motor ECU 40 calculates rotation speeds Nm1 and Nm2 of the respective motors MG1 and MG2, based on the rotational positions $\theta m1$ and $\theta m2$ of the respective rotors of the motors MG1 and MG2 input from the rotational position detection sensors 43 and 44.

The battery 50 is configured as, for example, a lithium ion rechargeable battery or a nickel metal hydride battery and is connected with the inverters 41 and 42 via the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. The battery ECU 52 obtains signals input from various sensors required for management of the battery 50 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC of the battery 50, based on an integrated value of the electric current Ib of the battery 50 input from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 obtains signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 65, and a vehicle speed V from a vehicle speed sensor 88. The HVECU 70 is connected with the engine ECU 24, the motor ECU 40, and the battery ECU 52 via the respective communication ports as described above.

The hybrid vehicle 20 of the embodiment having the above configuration runs in a hybrid drive mode (HV drive mode) driven with operation of the engine 22 and in an electric drive mode (EV drive mode) driven with stop of operation of the engine 22.

In the hybrid vehicle 20 of the embodiment, in the process of operating the engine 22, the engine ECU 24 performs, for example, intake air flow control by adjusting the position of the throttle valve 124 (throttle position TH), fuel injection control by adjusting the fuel injection amount from the fuel injection valve 126, and ignition control by adjusting the ignition timing of the ignition plug 130, such as to operate the engine 22 at a target rotation speed Ne* and a target torque Te*.

Figure 3:
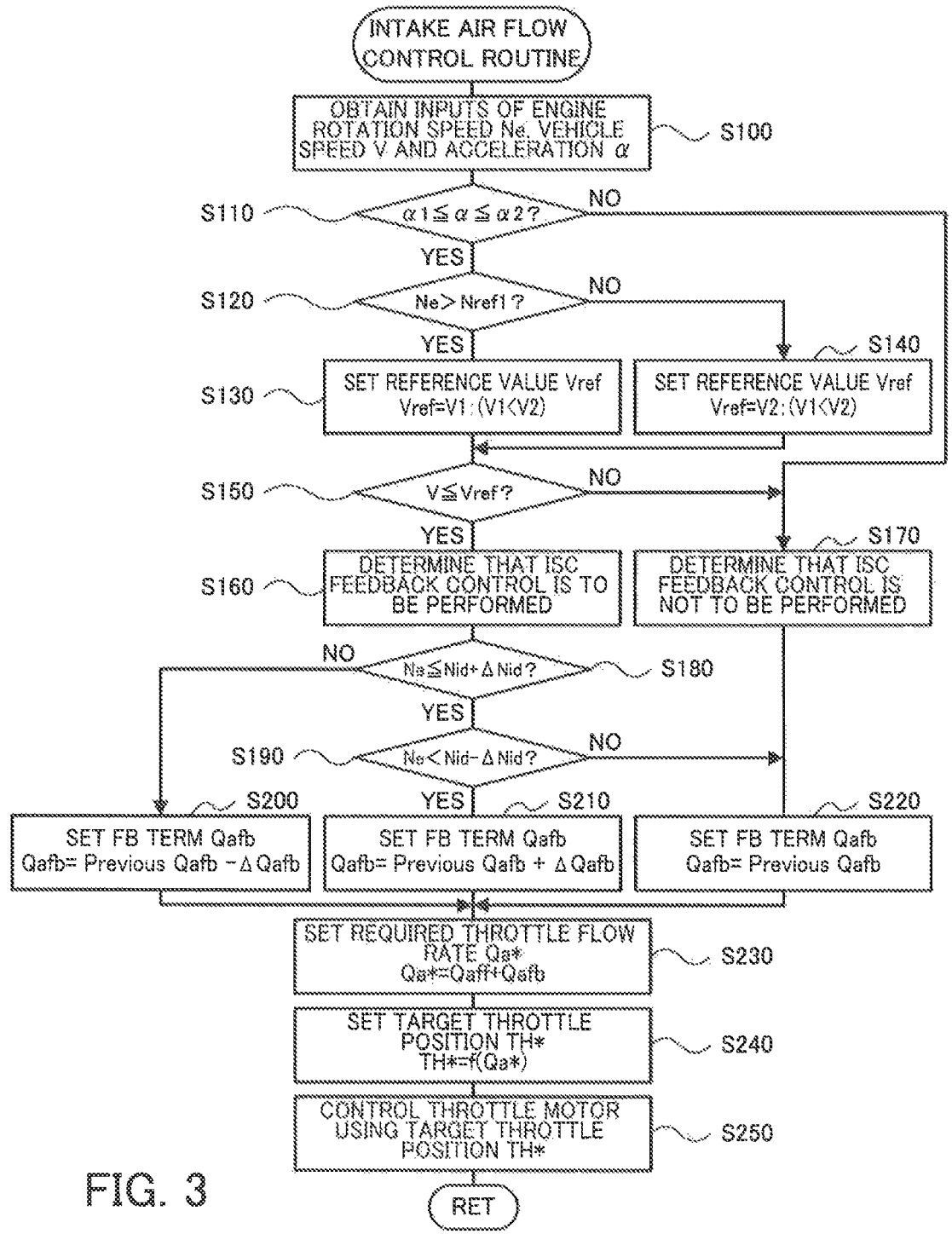
FIG. 3 is a flowchart showing one example of an intake air flow control routine performed by an engine ECU.

The following describes operations of the hybrid vehicle 20 of the embodiment having the above configuration or more specifically the intake air flow control at an idle operation time of the engine 22 (when the above target torque Te* is equal to value 0). At the idle operation time of the engine 22, a target idle rotation speed Nid is set to the target rotation speed Ne* of the engine 22. The target idle rotation speed Nid used may be, for example, 980 rpm, 1000 rpm, or 1020 rpm. FIG. 3 is a flowchart showing one example of an intake air flow control routine performed by the engine ECU 24. This routine is repeatedly performed at the idle operation time of the engine 22.

When the intake air flow control routine is triggered, the engine ECU 24 first obtains input data, such as the rotation speed Ne of the engine 22, the vehicle speed V, and an acceleration α (step S100). The rotational speed Ne of the engine 22 input here is a calculated value based on the crank angle θcr input from the crank position sensor 140. The vehicle speed V is a value that is detected by the vehicle speed sensor 88 and is input from the HVECU 70 by communication. The acceleration α is a value that is calculated as a variation in the vehicle speed V per unit time (for example, one second) and is input from the HVECU 70 by communication. The acceleration α may also be a value that is detected by an acceleration sensor mounted to the vehicle and is input from the HVECU 70 by communication.

After obtaining the input data, the engine ECU 24 subsequently compares the acceleration α with a negative threshold value α1 and with a positive threshold value α2 (step S110). The threshold value α1 denotes a reference value used to determine whether the vehicle is under rapid deceleration may be, for example, −9 km/h, −8 km/h or −7 km/h per second. The threshold value a2 denotes a reference value used to determine whether the vehicle is under rapid acceleration and may be, for example, +2 km/h, +3 km/h or +4 km/h per second.

When the acceleration α is not lower than the threshold value α1 and not higher than the threshold value α2 at step S110, the engine ECU 24 determines that the vehicle is neither under rapid deceleration nor under rapid acceleration (i.e., the vehicle speed V is rather stabilized) and then compares the rotation speed Ne of the engine 22 with a reference value Nref1 (step S120). The reference value Nref1 denotes a threshold value used to determine whether the rotation speed Ne of the engine 22 rather decreases relative to the target idle rotation speed Nid and is a rotational speed that is lower than the target idle rotation speed Nid and is higher than a resonance rotation speed Nres of the vehicle according to the embodiment. The resonance rotation speed Nres of the vehicle is designed to be sufficiently lower than the target idle rotation speed Nid and is designed to be, for example, 740 rpm, 750 rpm or 760 rpm. The reference value Nref1 used may be, for example, 890 rpm, 900 rpm, or 910 rpm.

When the rotation speed Ne of the engine 22 is higher than the reference value Nref1 at step S120, the engine ECU 24 determines that the rotation speed Ne of the engine 22 is not significantly decreased relative to the target idle rotation speed Nid, sets a predetermined vehicle speed V1 to a reference value Vref (step S130) and compares the vehicle speed V with the reference value Vref (step S150). When the vehicle speed V is equal to or lower than the reference value Vref, the engine ECU 24 determines that ISC feedback control is to be performed (step S160). The ISC feedback control is a feedback control to set a target throttle position TH* such that the rotation speed Ne of the engine 22 is in a range with regard to the target idle rotation speed Nid of not lower than a value (Nid−ΔNid) and higher than a value (Nid+ΔNid). The value ΔNid used may be, for example, 20 rpm, 30 rpm, or 40 rpm. The reference value Vref denotes an upper limit of the vehicle speed range in which the ISC feedback control is performed. The predetermined vehicle speed V1 used may be, for example, 8 km/h, 10 km/h or 12 km/h.

When it is determined that the ISC feedback control is to be performed, the engine ECU 24 sequentially compares the rotation speed Ne of the engine 22 with the value (Nid+ΔNid) and with the value (Nid−ΔNid) (steps S180 and S190). When the rotation speed Ne of the engine 22 is higher than the value (Nid+ΔNid), the engine ECU 24 sets a value obtained by subtracting a value ΔQafb from a previous feedback term (previous Qafb), to a feedback term Qafb that is used to set a required throttle flow rate Qa* as a required flow rate of the air passing through the throttle valve 124 (step S200). When the rotation speed Ne of the engine 22 is lower than the value (Nid−ΔNid), the engine ECU 24 sets a value obtained by adding the value ΔQafb to the previous feedback term (previous Qafb), to the feedback term Qafb (step S210). Additionally, when the rotation speed Ne of the engine 22 is not higher than the value (Nid+ΔNid) and is not lower than the value (Nid−ΔNid), the engine ECU 24 sets the previous feedback term (previous Qafb) to the feedback term Qafb, i.e., maintains the feedback term Qafb (step S220). The feedback term Qafb is set to value 0 that is an initial value in response to an ignition ON but is subsequently not reset to the value 0 even when idle operation of the engine 22 is interrupted (to shift to load operation of the engine 22 or to stop operation of the engine 22). The value ΔQafb denotes an amount of change in the feedback term Qafb per interval of execution of this routine and is set according to the specification of the engine 22.

After setting the feedback term Qafb as described above, the engine ECU 24 subsequently sets a value obtained by adding the set feedback term Qafb to a feedforward term Qaff, to the required throttle flow rate Qa* (step S230). The feedforward term Qaff is a value (expected value) that is determined in advance experimentally or by analysis, such that the rotation speed Ne of the engine 22 becomes equal to or approximate to the target idle rotation speed Nid.

Figure 4:
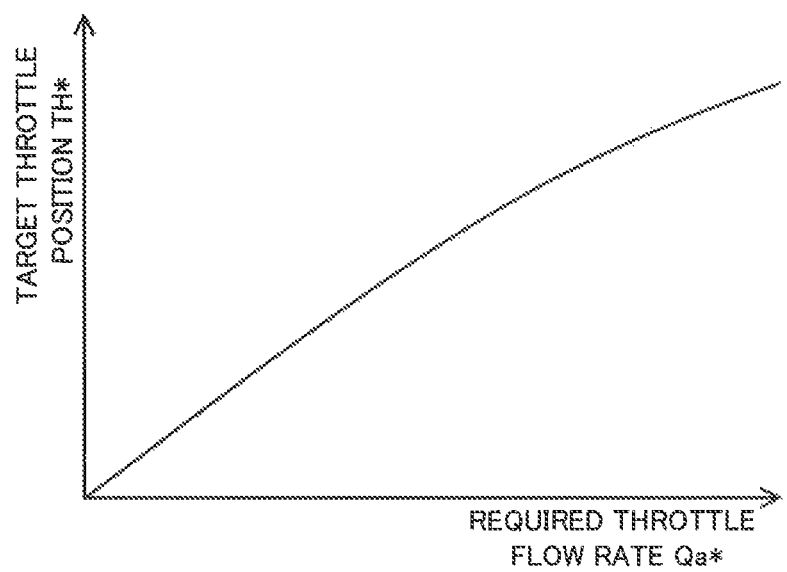
FIG. 4 is one example of an intake air flow setting map.

The engine ECU 24 subsequently sets the target throttle position TH* based on the required throttle flow rate Qa* (step S240), controls the throttle motor 136 such that the position of the throttle valve 124 (throttle position TH) approaches the target throttle position TH* (step S250), and then terminates this routine. A procedure employed to set the target throttle position TH* stores in advance a predetermined relationship between the required throttle flow rate Qa* and the target throttle position TH* as an intake air flow setting map into the ROM (not shown) and sets a value of the target throttle position TH* that is read corresponding to a given value of the required throttle flow rate Qa* from the intake air flow setting map. One example of this intake air flow setting map is shown in FIG. 4. As illustrated, the target throttle position TH* is set to provide a larger value corresponding to a larger value of the required throttle flow rate Qa* compared with a value provided corresponding to a smaller value of the required throttle flow rate Qa* or more specifically to increase with an increase in the required throttle flow rate Qa*.

This ISC feedback control provides a smaller value of the feedback term Qafb and thereby reduces the target throttle position TH* when the rotation speed Ne of the engine 22 is higher than the value (Nid+ΔNid). The ISC feedback control also provides a larger value of the feedback term Qafb and thereby increases the target throttle position TH* when the rotation speed Ne of the engine 22 is lower than the value (Nid−ΔNid). Additionally, the ISC feedback control maintains the feedback term Qafb and thereby maintains the target throttle position TH* when the rotation speed Ne of the engine 22 is not higher than the value (Nid+ΔNid) and is not lower than the values (Nid−ΔNid). Such control accordingly causes the rotation speed Ne of the engine 22 to be in the range of not lower than the value (Nid−ΔNid) and not higher than the value (Nid+ΔNid).

When the vehicle speed V is higher than the reference value Vref at step S150, the engine ECU 24 determines that the ISC feedback is not to be performed (step S170), and sets the previous feedback term Qafb (previous Qafb) to the feedback term Qafb, i.e., maintains the feedback term Qafb (step S220), and performs the processing of and after step S230 described above. This control flow maintains the feedback term Qafb and thereby maintains the target throttle position TH*, irrespective of the relationship between the rotation speed Ne of the engine 22 and the target idle rotation speed Nid. As described above, the feedback term Qafb is maintained when the vehicle speed V is higher than the reference value Vref. This suppresses a fluctuation (for example, an abrupt change) of the feedback term Qafb and thereby suppresses a fluctuation (for example, an abrupt change) of the target throttle position TH*.

When the rotation speed Ne of the engine 22 is not higher than the reference value Nref1 at step S120, the engine ECU 24 sets a predetermined vehicle speed V2 that is higher than the predetermined vehicle speed V1 described above to the reference value Vref (step S140) and performs the processing of and after step S150 described above. The predetermined vehicle speed V2 used may be, for example, 130 Km/h, 140 Km/h or 150 Km/h. As described above, in the case where the rotation speed Ne of the engine 22 is not higher than the reference value Nref1, the upper limit of the vehicle speed range in which the ISC feedback control is performed is extended, compared with the case where the rotation speed Ne of the engine 22 is higher than the reference value Nref1.

It is here assumed that the driving procedure performs idle operation of the engine 22 during a vehicle stop and in the cold state of the engine 22, subsequently terminates the idle operation of the engine 22 and shifts to load operation of the engine 22, and then performs idle operation of the engine 22 at a certain vehicle speed after warming-up of the engine 22. In the cold state of the engine 22, an increase correction of the amount of fuel injection is performed to stabilize combustion in the engine 22. When the driving procedure performs idle operation of the engine 22 during a vehicle stop and in the cold state of the engine 22, the increase correction of the amount of fuel injection is performed. This increases the amount of fuel that is mixed with engine oil and results in decreasing the viscosity of engine oil and reducing the friction of the engine 22. The rotation speed Ne of the engine 22 is thus likely to increase relative to the target idle rotation speed Nid. When the rotation speed Ne of the engine 22 becomes higher than the value (Nid+ΔNid), the ISC feedback control provides a small value of the feedback term Qafb (i.e., provides a large absolute value in negative scale) that is used to set the required throttle flow rate Qa* and results in relatively decreasing the required throttle flow rate Qa* and thereby the target throttle position TH*. When the driving procedure subsequently terminates the idle operation of the engine 22 and shifts to load operation of the engine 22 and then performs idle operation of the engine 22 at a certain vehicle speed after warming-up of the engine 22, the increase correction of the amount of fuel injection is not performed. This decreases the amount of fuel that is mixed with engine oil and rather increases the friction of the engine 22. In this case, when the feedback term Qafb is maintained at a small value (i.e., a large absolute value in negative scale) and the required throttle flow rate Qa* and thereby the target throttle position TH* are maintained at relatively small values, the rotation speed Ne of the engine 22 is likely to be rather decreased. According to the embodiment, in the case where the rotation speed Ne of the engine 22 becomes equal to or lower than the reference value Nref1, the upper limit of the vehicle speed range that allows the ISC feedback control to be performed is extended, compared with the case where the rotation speed Ne of the engine 22 is higher than the reference value Nref1. This control flow suppresses the rotation speed Ne of the engine 22 from further decreasing to reach the resonance rotation speed Nres of the vehicle. As a result, this suppresses an increase in vibration of the vehicle.

When the acceleration α is lower than the threshold value α1 or is higher than the threshold value α2 at step S110, the engine ECU 24 determines that the vehicle is under rapid deceleration or under rapid acceleration and determines that the ISC feedback control is not to be performed (step S170). The engine ECU 24 subsequently sets the previous feedback term (previous Qafb) to the feedback term Qafb, i.e., maintains the feedback term Qafb (step S220) and performs the processing of and after step S230 described above. This control flow maintains the feedback term Qafb under rapid deceleration or under rapid acceleration of the vehicle. This accordingly suppresses a fluctuation (for example, an abrupt change) of the feedback term Qafb and thereby suppresses a fluctuation (for example, an abrupt change) of the target throttle position TH*.

In the hybrid vehicle 20 of the embodiment described above, during idle operation of the engine 22, when the vehicle speed V is not higher than the reference value Vref, the engine 22 is controlled with setting the target throttle position TH* by the ISC feedback control performed to cause the rotation speed Ne of the engine 22 to be in a range of not lower than a value (Nid−α) and not higher than a value (Nid+α). When the vehicle speed V is higher than the reference value Vref, on the other hand, the engine 22 is controlled with setting the target throttle position TH* to a fixed value (i.e., maintaining the feedback term in the ISC feedback control). In the case where the rotation speed Ne of the engine 22 becomes equal to or lower than the reference value Nref1 that is smaller than the target idle rotation speed Nid and is larger than the resonance rotation speed Nres of the vehicle, a larger reference value Vref is provided, compared with the case where the rotation speed Ne of the engine 22 is higher than the reference value Nref1. This makes it more likely to perform the ISC feedback control when the rotation speed Ne of the engine 22 becomes equal to or lower than the reference value Nref1. As a result, this suppresses the rotation speed Ne of the engine 22 from further decreasing to reach the resonance rotation speed Nres of the vehicle and thereby suppresses an increase in vibration of the vehicle.

In the hybrid vehicle 20 of the embodiment, when the rotation speed Ne of the engine 22 is higher than the reference value Nref1, the predetermined vehicle speed V1 is set to the reference value Vref. When the rotation speed Ne of the engine 22 is not higher than the reference value Nref1, the predetermined vehicle speed V2 that is higher than the predetermined vehicle speed V1 is set to the reference value Vref. According to a modification, after the rotation speed N2 of the engine 22 becomes equal to or lower than the reference value Nref1 and the reference value Vref is changed from the predetermined vehicle speed V1 to the predetermined vehicle speed V2, the reference value Vref may be kept to the predetermined vehicle speed V2 irrespective of an increase in the rotation speed Ne of the engine 22 to be higher than the reference value Nref1, until elapse of a predetermined time period or until the rotation speed Ne of the engine 22 becomes higher than a reference value Nref3 that is larger than the reference value Nref1. This configuration suppresses frequent changeover between execution and non-execution of the ISC feedback control during idle operation of the engine 22 at a certain vehicle speed (when the vehicle speed V is between the predetermined vehicle speed V1 and the predetermined vehicle speed V2).

In the hybrid vehicle 20 of the embodiment, the ISC feedback control is performed under the conditions that the acceleration α is not lower than the threshold value α1 and is not higher than the threshold value α2 (condition of neither under rapid deceleration nor under rapid acceleration (i.e., condition that the vehicle speed V is rather stabilized)) and that the vehicle speed V is not higher than the reference value Vref. Only the condition that the vehicle speed V is not higher than the reference value Vref may, however, be used as the condition of the ISC feedback control.

Figure 5:
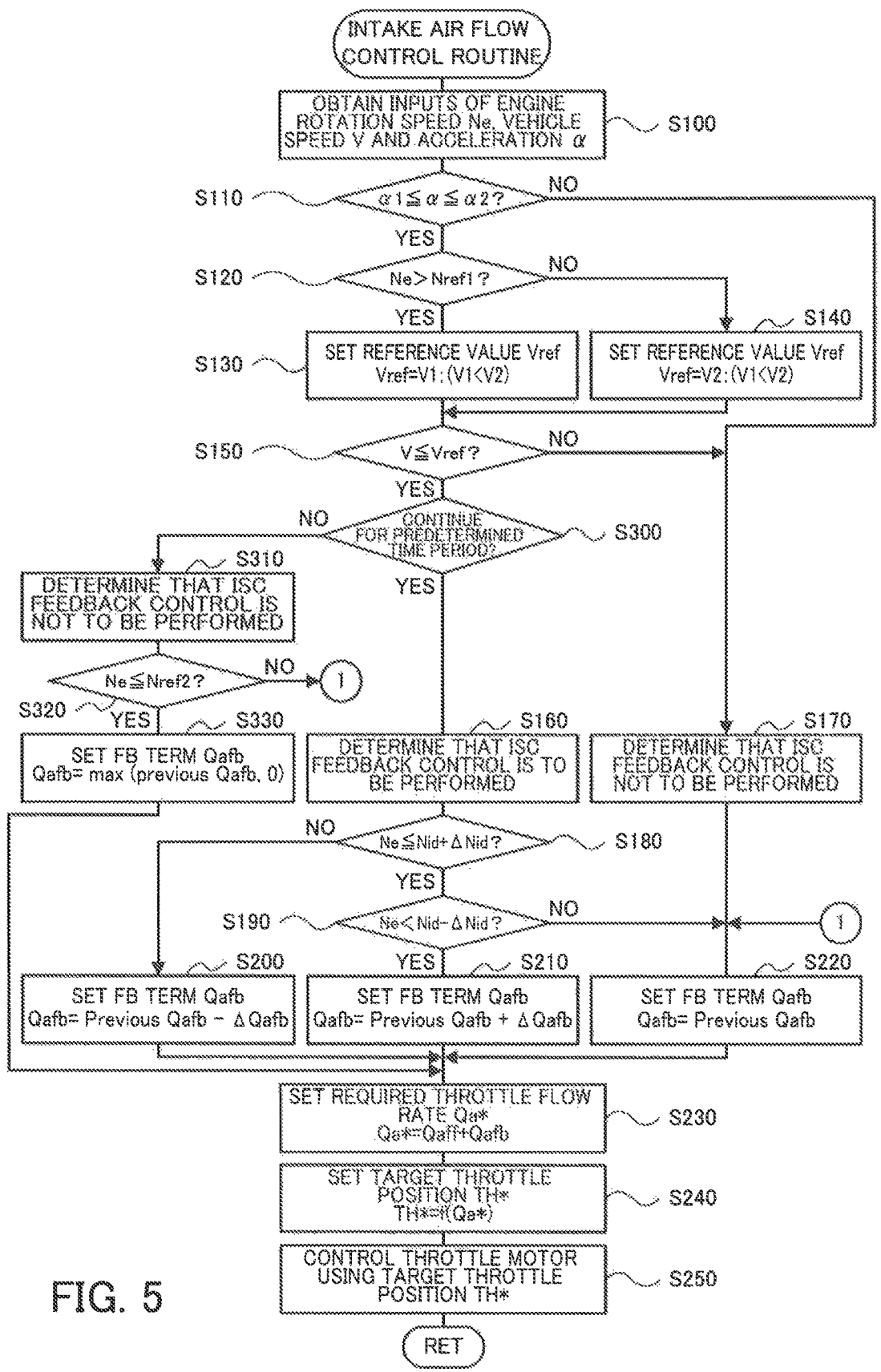
FIG. 5 is a flowchart showing one example of an intake air flow control routine according to a modification.

In the hybrid vehicle 20 of the embodiment, the engine ECU 24 performs the intake air flow control routine shown in FIG. 3. The engine ECU 24 may, however, perform an intake air flow control routine shown in FIG. 5 instead. The intake air flow control routine shown in FIG. 5 is similar to the intake air flow control routine shown in FIG. 3 except addition of the processing of steps S300 to S330. The like steps are expressed by the like step numbers, and their detailed description is omitted.

In the intake air flow control routine of FIG. 5, when it is determined at step S150 that the vehicle speed V is not higher than the reference value Vref, the engine ECU 24 subsequently determines whether the condition that the vehicle speed V is not higher than the reference value Vref continues for a predetermined time period T1 (step S300). When the ISC feedback control is started immediately after satisfaction of the condition that the vehicle speed V is not higher than the reference value Vref, there is a possibility chat the feedback term Qafb has a slight fluctuation (for example, a slight abrupt change) and the target throttle position TH* has a slight fluctuation (for example, a slight abrupt change). The predetermined time period T1 is specified as a time duration that reduces the possibility of the fluctuation of the feedback term. Qafb even when the ISC feedback control is started and may be, for example, one second, two seconds or three seconds. When it is determined that the condition that the vehicle speed V is not higher than the reference value Vref continues for the predetermined time period T1, the engine ECU 24 determines that the ISC feedback control is to be performed (step S160) and performs the processing of and after step S180 described above.

When it is determined at step S300 that the condition that the vehicle speed V is not higher than the reference value Vref does not continue for the predetermined time period T1, on the other hand, the engine ECU 24 determines that the ISC feedback control is not to be performed (step S310). Non-execution of the ISC feedback control suppresses a fluctuation (for example, an abrupt change) of the feedback term Qafb and suppresses a fluctuation (for example, an abrupt change) of the feedback term Qafb.

The engine ECU 24 subsequently compares the rotation speed Ne of the engine 22 with a reference value Nref2 that is smaller than the above reference value Nref1 and is larger than the resonance rotation speed Nres of the vehicle (step S320). The reference value Nref2 may be smaller than the reference value Nref1 by, for example, 20 rpm, 30 rpm, or 40 rpm.

When the rotation speed Ne of the engine 22 is higher than the reference value Nref2 at step S320, the engine ECU 24 sets the previous feedback terra (previous Qafb) to the feedback term Qafb, i.e., maintains the feedback term Qafb (step S220) and then performs the processing of and after step S230 described above. When the rotation speed Ne of the engine 22 is not higher than the reference value Nref2, on the other hand, the engine ECU 24 sets a lower limit guard value of the previous feedback term (previous Qafb) with value 0 to the feedback term Qafb (step S330) and then performs the processing of and after step S230 described above. The reason why the rotation speed Ne of the engine 22 is rather decreased relative to the target idle rotation speed Nid may be attributed to maintaining the feedback terra Qafb at a small value (i.e., a large absolute value in negative scale) and maintaining the target throttle position TH* at a relatively small value as described above. Controlling the feedback term Qafb to be not less than the value 0 is thus expected to suppress the rotation speed Ne of the engine 22 from further decreasing to reach the resonance rotation speed Nres. As a result, this suppresses an increase in vibration of the vehicle.

Figure 6:
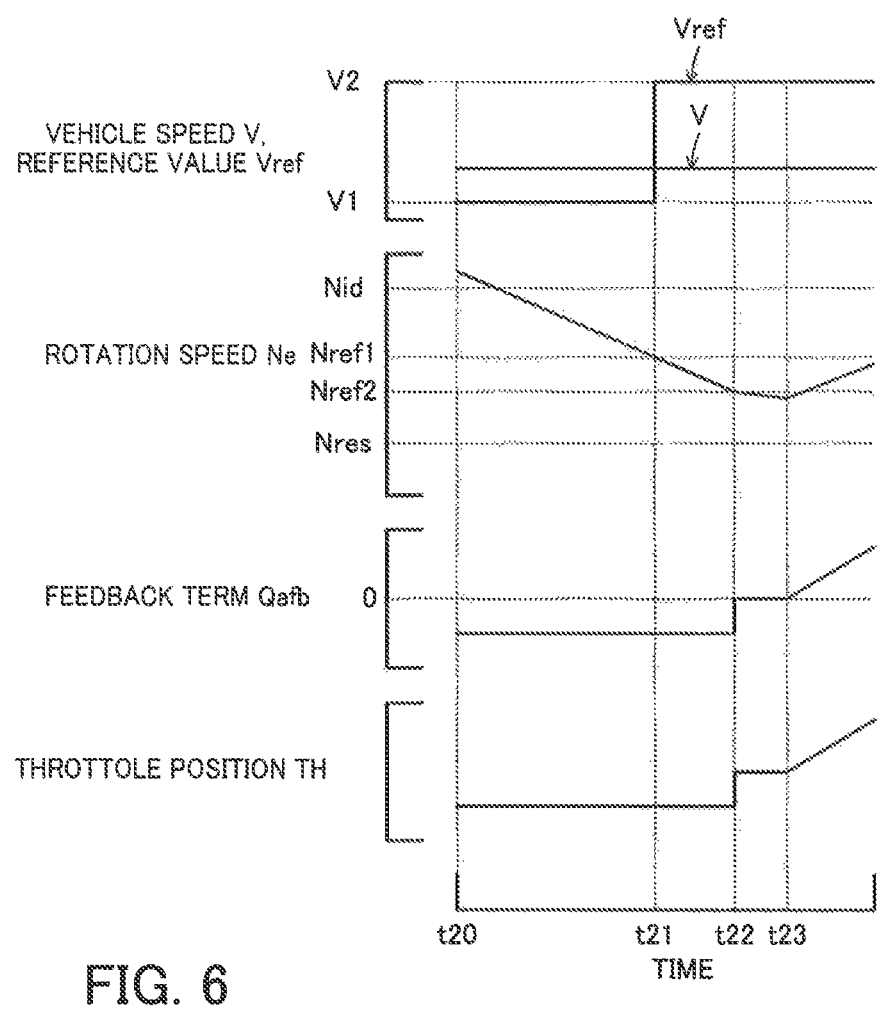
FIG. 6 is a diagram illustrating one example of variations in the vehicle speed V, the reference value Vref, and the rotation speed Ne of the engine, the feedback term Qafb, and the throttle position TH during idle operation time of the engine according to another modification.

FIG. 6 is a diagram illustrating one example of variations in the vehicle speed V, the reference value Vref, and the rotation speed Ne of the engine 22, the feedback term Qafb, and the throttle position TH during idle operation time of the engine 22 according to this modification. FIG. 6 illustrates the state of idle operation of the engine 22 under the conditions of a relatively small feedback term Qafb (i.e., a relatively large absolute value in negative scale) on termination of previous idle operation of the engine 22 and a current vehicle speed V higher than the reference value Vref (predetermined vehicle speed V1). When current idle operation of the engine 22 is started (at time t20) in the state that the vehicle speed V is higher than the reference value Vref (predetermined vehicle speed V1), the relatively small feedback term Qafb provides a relatively small throttle opening TH and decreases the rotation speed Ne of the engine 22. When the rotation speed Ne of the engine 22 becomes equal to or lower than the reference value Nref1 (at time t21), the reference value Vref is changed from the predetermined vehicle speed V1 to the predetermined vehicle speed V2, so that the vehicle speed V becomes equal to or lower than the reference value Vef. When the rotation speed Ne of the engine 22 subsequently becomes equal to or lower than the reference value Nref2 (at time t22), the feedback term Qafb is changed from a negative value to the value 0. This increases the throttle position TH and thereby suppresses a further decrease in the rotation speed Ne of the engine 22. As a result, this suppresses the rotation speed Ne of the engine 22 from further decreasing to reach the resonance rotation speed Nres of the vehicle and suppresses an increase in vibration of the vehicle. When the condition that the vehicle speed V is not higher than the reference value Vref continues for the predetermined time period T1 (at time t23), the ISC feedback control is started to gradually increase the feedback terra Qafb. This results in increasing the throttle position TH and increasing the rotation speed Ne of the engine 22.

In the hybrid vehicle 20 of the embodiment, the ISC feedback control is a feedback control to set the target throttle position TH* such that the rotation speed Ne of the engine 22 is in the range of not lower than the value (Nid−ΔNid) and not higher than the value (Nid+ΔNid). According to a modification, the ISC feedback control may be a feedback control to set the target throttle position TH* such that the rotation speed Ne of the engine 22 becomes equal to the target idle rotation speed Nid. In this modification, the feedback term Qafb may be set by using the value ΔNid set to the value 0 in the processing of steps S180 to S220 in the intake air flow control routine shown in FIG. 3 or FIG. 5.

In the hybrid vehicle 20 of the embodiment, the ISC feedback control is performed to set the feedback term Qafb based on the rotation speed Ne of the engine 22 and the target idle rotation speed Nid, to set the required throttle flow rate Qa* based on the set feedback term Qafb, and to set the target throttle position TH* based on the set required throttle flow rate Qa*. According to a modification, the ISC feedback control may be performed to set the target throttle position TH* without setting the required throttle flow rate Qa*. In this modification, a feedback term THfb used to set the target throttle position TH* may be set based on the rotation speed Ne of the engine 22 and the target idle rotation speed Nid, and the target throttle position TH* may be set based on the set feedback term THfb.

The hybrid vehicle 20 of the embodiment uses the battery 50 as the electrical storage device, but a capacitor may be used as the electrical storage device.

The hybrid vehicle 20 of the embodiment is configured to include the engine ECU 24, the motor ECU 40, the battery ECU 52, and HVECU 70, but at least part of these ECUs may be configured as a single electronic control unit.

Figure 7:
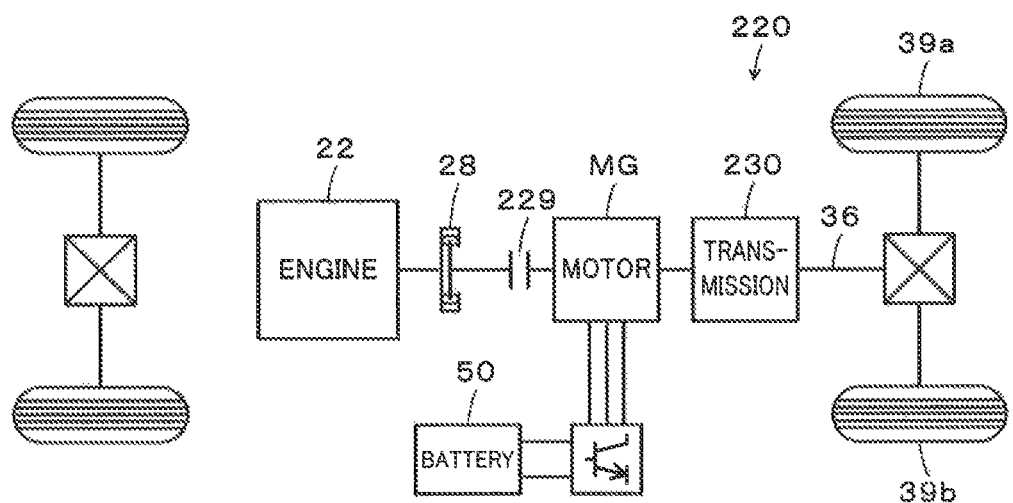
FIG. 7 is a configuration diagram illustrating the schematic configuration of another hybrid vehicle according to another modification.

According to the above embodiment, the present disclosure is applied to the hybrid vehicle 20 configured such that the sun gear of the planetary gear 30 is connected with the motor MG1, the carrier is connected with the engine 22 via the damper 28, and the ring gear is connected with the driveshaft 36 coupled with the drive wheels 39a and 39b and with the motor MG2. The present disclosure may be applied to a hybrid vehicle of any configuration including an engine connected via a damper with a driveshaft that is coupled with an axle and a motor connected with the driveshaft. For example, the present disclosure may be applied to a hybrid vehicle 220 of a modification configured such that a motor MG is connected via a transmission 230 with a driveshaft 36 coupled with drive wheels 39a and 39b and an engine 22 is connected with the motor MG via a clutch 229 and a damper 28 as shown in FIG. 7. The description of the embodiment is similarly applicable to idle operation of the engine 22 at ON position of the clutch 229 in the hybrid vehicle 220.

In the hybrid vehicle of this aspect, during the idle operation of the engine, on satisfaction of the predetermined condition, the control device mat control the engine with setting a target throttle position that is a target value of the throttle position by feedback control such that the rotation speed of the engine becomes equal to the target idle rotation speed or is in the predetermined rotation speed range, and on non-satisfaction of the predetermined condition, the control device may control the engine with setting the target throttle position by maintaining a feedback term in the feedback control. During the idle operation of the engine, on satisfaction of the predetermined condition, the hybrid vehicle of this aspect performs the feedback control such that the rotation speed of the engine becomes equal to the target idle rotation speed or in the predetermined rotation speed range. On non-satisfaction of the predetermined condition, the hybrid vehicle of this aspect suppresses a fluctuation (for example, an abrupt change) of the feedback term and suppresses a fluctuation (for example, an abrupt change) of the throttle position.

In this case, during the idle operation of the engine, on satisfaction of the predetermined condition, the control device may set the target throttle position by maintaining the feedback term until a predetermined time period has elapsed since a start of satisfaction of the predetermined condition. When feedback control is started immediately after satisfaction of the predetermined condition, there is a possibility that the feedback term has a fluctuation (for example, an abrupt change) and a throttle position has a fluctuation (for example, an abrupt change). Maintaining the feedback term until elapse of the predetermined time period since the start of satisfaction of the predetermined condition thus suppresses a fluctuation (for example, an abrupt change) of the feedback term and a fluctuation (for example, an abrupt change) of the throttle position.

In this case, during the idle operation of the engine, on satisfaction of the predetermined condition, the control device may set the target throttle position by setting the feedback term to be not less than value 0 when the rotation speed of the engine becomes equal to or lower than a second predetermined rotation speed that is lower than the predetermined rotation speed and is higher than the resonance rotation speed until the predetermined time period has elapsed since the start of satisfaction of the predetermined condition. The reason why the rotation speed of the engine becomes equal to or lower than the second predetermined rotation speed may be attributed to providing a negative value of the feedback term and thereby providing a relatively small throttle position. Accordingly setting the target throttle position with setting the feedback term to be not less than the value 0 is thus expected to suppress a further decrease in the rotation speed of the engine.

The following describes the correspondence relationship between the primary components of the embodiment and the primary components of the disclosure described in Summary. The engine 22 of the embodiment corresponds to the "engine", the motor MG2 corresponds to the "motor", the battery 50 corresponds to the "electrical storage device", and the engine ECU 24 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising:
an engine connected via a damper with a driveshaft that is coupled with an axle;
a motor connected with the driveshaft; and
a control device configured to control the engine, wherein during idle operation of the engine, on satisfaction of a predetermined condition including a condition that a vehicle speed is not higher than a reference value, the control device controls the engine with adjusting a throttle position such that a rotation speed of the engine becomes equal to a target idle rotation speed or is in a predetermined rotation speed range including the target idle rotation speed, and on non-satisfaction of the predetermined condition, the control device controls the engine with setting the throttle position to a fixed value, wherein
the reference value is set such as to provide a larger value when the rotation speed of the engine becomes equal to or lower than a predetermined rotation speed that is lower than the target idle rotation speed and is higher than a resonance rotation speed of the vehicle, compared with a value provided when the rotation speed of the engine is higher than the predetermined rotation speed.

2. The hybrid vehicle according to claim 1,
wherein during the idle operation of the engine, on satisfaction of the predetermined condition, the control device controls the engine with setting a target throttle position that is a target value of the throttle position by feedback control such that the rotation speed of the engine becomes equal to the target idle rotation speed or is in the predetermined rotation speed range, and on non-satisfaction of the predetermined condition, the control device controls the engine with setting the target throttle position by maintaining a feedback term in the feedback control.

3. The hybrid vehicle according to claim 2,
wherein during the idle operation of the engine, on satisfaction of the predetermined condition, the control device sets the target throttle position by maintaining the feedback term until a predetermined time period has elapsed since a start of satisfaction of the predetermined condition.

4. The hybrid vehicle according to claim 3,
wherein during the idle operation of the engine, on satisfaction of the predetermined condition, the control device sets the target throttle position by setting the feedback term to be not less than value 0 when the rotation speed of the engine becomes equal to or lower than a second predetermined rotation speed that is lower than the predetermined rotation speed and is higher than the resonance rotation speed until the predetermined time period has elapsed since the start of satisfaction of the predetermined condition.

* * * * *